Feb. 8, 1966     T. C. FOSTER ETAL     3,234,338
ELECTROMAGNETIC TRANSDUCERS
Filed Oct. 2, 1961     2 Sheets-Sheet 1
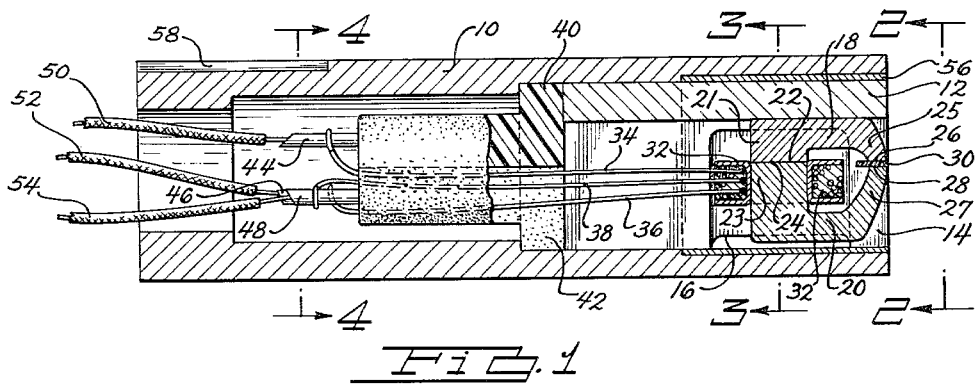
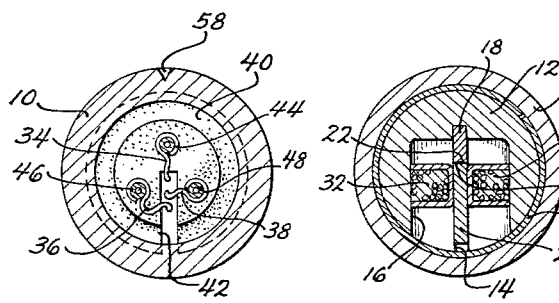
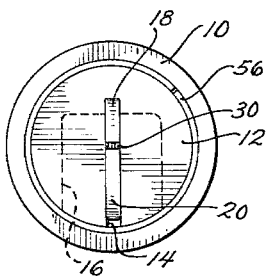
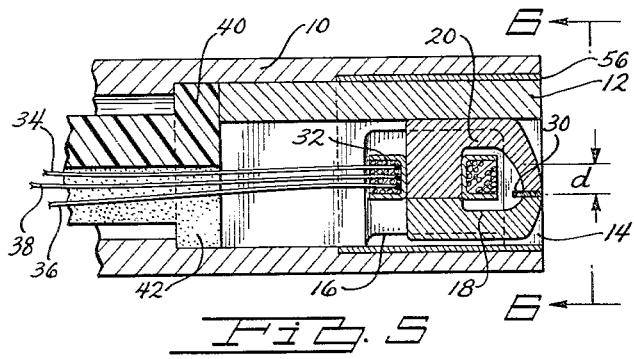
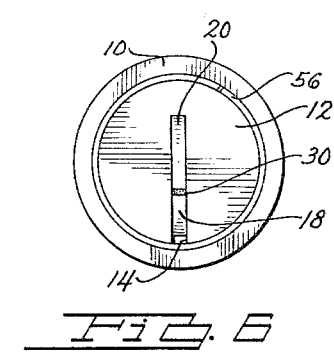
INVENTORS
THEODORE C. FOSTER &
BY JOSEPH E. SMITH JR.
Bower & Patalidis
ATTORNEYS Feb. 8, 1966    T. C. FOSTER ETAL    3,234,338
ELECTROMAGNETIC TRANSDUCERS
Filed Oct. 2, 1961    2 Sheets-Sheet 2
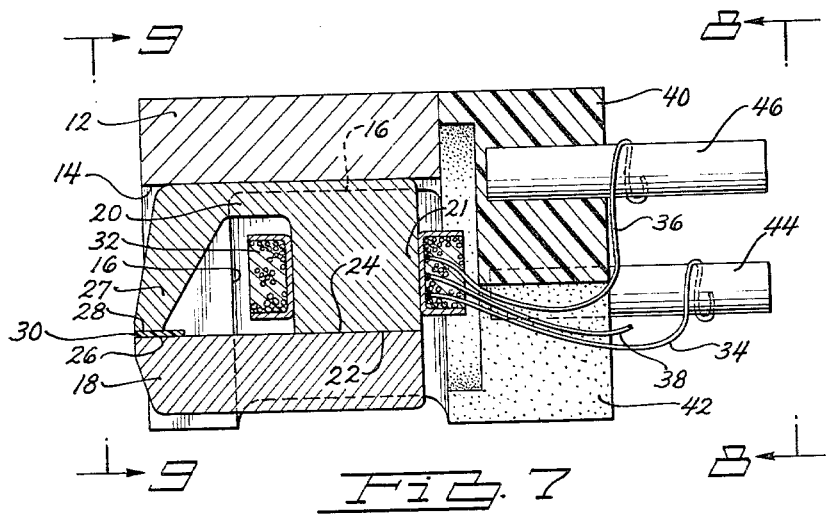
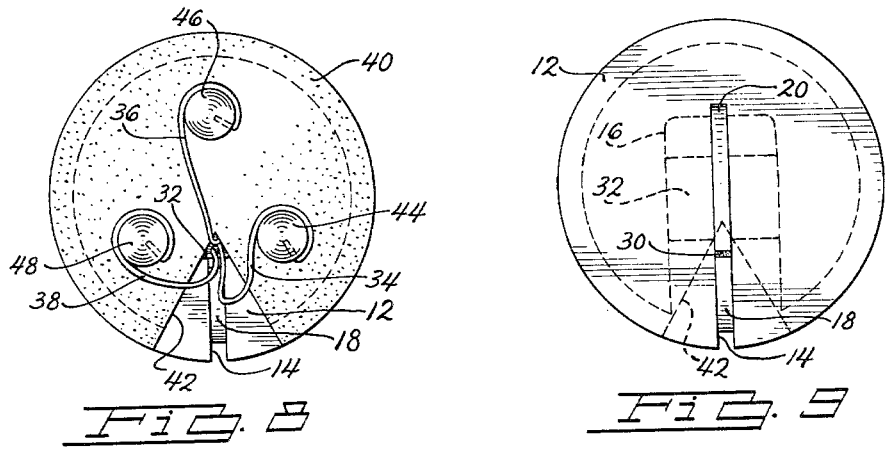
INVENTORS
THEODORE C. FOSTER &
BY JOSEPH E. SMITH Jr.
Bower & Patalidis
ATTORNEYS United States Patent Office 3,234,338
Patented Feb. 8, 1966

3,234,338
ELECTROMAGNETIC TRANSDUCERS
Theodore C. Foster, Northville, and Joseph E. Smith, Jr., Birmingham, Mich., assignors to Ex-Cell-O Corporation, Detroit, Mich., a corporation of Michigan
Filed Oct. 2, 1961, Ser. No. 142,419
7 Claims. (Cl. 179—100.2)

This invention relates to electromagnetic transducers in general, and in particular to improvements in magnetic transducers of the type used for recording and reproducing intelligence in connection with a magnetizable surface such as is commonly found in intelligence storage devices of the magnetic tape, drum and disc types, and the like.

The invention is an improvement upon the copending application of David J. Carpenter, Serial No. 754,762, filed August 13, 1958, and assigned to the same assignee as the present invention, which has now issued as U.S. Letters Patent No. 3,026,379.

The principal object of the invention is to provide a universal type of electromagentic transducer which can be economically mass-produced thereby resulting in a low unitary cost, which is simple, light and compact, which can be easily imbedded in gliding pads or in fluid bearing shoes as is often done in combination with magnetic drums and discs using non-contact transducer heads, and which utilizes a minimum number of standardized parts.

Another object of the invention is to provide a transducer which is simple and easy to manufacture and assemble, and which is sensibly of lower cost than transducers hitherto commercially available.

A further object of the invention is to provide a transducer structure in which the magnetic core is snugly and fixedly supported in a body insert or retainer to achieve and retain the correct alignment of the magnetic gap in relation to the direction of motion of the recording surface.

Still another object of the invention is to provide a transducer which has its magnetic gap centered with the axis of the housing incasing the components.

Still a further object of the invention is to provide a transducer which has its magnetic gap off-center in relation to the axis of the housing incasing the components, by simply rotating the magnetic core 180 degrees from the position that provides a transducer with a centered magnetic gap.

Yet another object of the inventon is to provide a transducer having constitutive elements held in cooperative cohesion by potting, using a thermosetting material.

Other objects and advantages will become apparent from the following description and claims, and the accompanying drawings which disclose, by way of example, the principle of the invention and the best modes which have been contemplated of applying that principle.

In the drawings, illustrating the invention at a greatly enlarged scale for the sake of clarity and in which like numerals refer to like or equivalent elements:

FIG. 1 is a longitudinal sectional view of an electromagnetic transducer incorporating the present invention, and having a magnetic gap on its center line;

FIG. 2 is an end view of the invention as seen from line 2—2 of FIG. 1;

FIG. 3 is a transverse sectional view along line 3—3 of FIG. 1, observed in the direction of the arrows;

FIG. 4 is a transverse sectional view along line 4—4 of FIG. 1, observed in the direction of the arrows;

FIG. 5 is a partial longitudinal sectional view of a modification of the invention showing an electromagnetic transducer similar to the one shown in FIG. 1, but having its magnetic core rotated 180° from the position shown in FIG. 1;

FIG. 6 is an end view of the modification of FIG. 5, as seen from line 6—6 of FIG. 5;

FIG. 7 is a partial longitudinal sectional view of another modification of the invention;

FIG. 8 is an end view of the modification of FIG. 7, as seen from line 8—8 of FIG. 7; and FIG. 9 is an end view of the same modification, as seen from line 9—9 of FIG. 7.

Referring now to the drawings, and more particularly to FIGS. 1–4, a tubular body housing 10, made preferably of a non-magnetic material, constitutes a casing for the components of the electromagnetic transducer of the invention.

Within the body housing 10 and substantially concentrically therein, is disposed a cylindrical body insert or retainer element 12 having a longitudinal slot 14 extending diametrally from the periphery of the retainer cylindrical surface to past the axis of said retainer. There is also a cavity or pocket 16 (best seen in FIGS. 1 and 3) within the body insert or retainer element 12 for the purpose hereinafter explained.

A substantially thin magnetic core consisting of two general C-shaped sections 18 and 20 is disposed snugly within the slot 14. Core section 18 has shorter legs than core section 20, one such leg 21 ending in a surface 22 adapted to abut the end surface 24 of the corresponding leg 23 of core section 20; the other leg 25 of core section 18 forms a pole piece with a flux gap defining face 26, core section 20 having also a leg forming a corresponding pole piece with a flux gap defining face 28. A thin sliver of flux-deflecting non-magnetic material 30 is located between the flux gap faces 26 and 28, in the usual manner, the magnetic flux loop being thus forced to close through the magnetizable record surface (not shown).

A signal coil or winding 32 is disposed around leg 23 for inducing a variable magnetic flux through the flux loop during recording operation, or for transducing a variable magnetic flux into a variable electrical signal during reading or playback operation, as is well-known to those versed in the art. The pocket 16 is provided in the retainer 12 to afford a space for the coil when the core is introduced within the slot 14.

The coil 32 may be made of wound electric wire having two terminal wires 34 and 36 with a center tap wire 38, or alternately it may be made of two half-coils placed serially and still having two terminal wires 34 and 36, with two common wires being the electrical equivalent of the center tap wire 38. One half-coil is excited for recording and the full coil winding is used for reading or playback.

Upon the end of retainer 12 opposite the flux deflecting gap, a terminal block 40 of insulating material is disposed within the body housing 10 as shown in FIGS. 1 and 4. A slot 42, substantially aligned with slot 14, affords a passage for the terminal and center tap wires 34, 36 and 38 which are connected to binding pins 44, 46 and 48. Input-output leads 50, 52 and 54 are soldered or otherwise connected to the binding pins for junction of the electromagnetic transducer with other associated equipment.

As a precautionary measure against stray magnetic interference, a magnetic shield 56 may be disposed around the end of the retainer 12 surrounding the pole pieces of the core, by being inserted in an enlarged portion of the internal bore of the body housing 10.

The elements constituting the electromagnetic transducer of the invention are assembled as heretofore illustrated and described and are held firmly together by an operation consisting of impregnation with a potting material, for example of the epoxy resin class, which is subsequently cured at a relatively low temperature for a determined period of time. To enable correct alignment of the magnetic gap in relation to a reference axis, a scribe line or shallow V-groove 58 is scored on the exterior of the body housing 10.

The dimensions of the legs of the C-shaped unequal core sections 18–20 are such that the magnetic gap 30 is substantially on the centerline of the body housing. The active end face of the transducer is spherically lapped around a center situated on the centerline or axis of the transducer. This makes a better defined magnetic gap capable of being positioned in very close proximity to the record surface without risk of any portion of the end face touching and damaging the record surface.

The modification of FIGS. 5–6 comprises the same constitutive elements as are present in the precedently described embodiment of the invention. The sole difference consists in having the magnetic core rotated 180° in respect to the position it occupies in the disclosure of FIGS. 1–4. This is done by using the same core sections 18 and 20, but in inserting the core-coil subassembly into the slot 14 and pocket 16 cavities of the retainer 12 rotated a full half circle. Core section 20 now occupies the position occupied precedently by core section 18, and core section 18 occupies the position of core section 20. The gap space 30 is now no longer on the centerline of the transducer, but is a distance $d$ therefrom. The active face of the transducer is also spherically lapped around a center which is situated on an imaginary line parallel the centerline of the transducer and passing by the gap space 30.

FIG. 7–9 illustrate an electromagnetic transducer substantially similar to the transducer heretofore described but from which the body housing and the tubular magnetic shield have been eliminated. The transducer consists of a retainer 12 adapted to receive a core 18–20 around which a coil 32 is wound in the usual manner, the core and the coil being disposed respectively in a slot 14 and a pocket 16 as hereinbefore explained.

The coil terminal and center tap wires are disposed in a slot or V-groove 42 of an insulating terminal block 40 bonded, cemented or otherwise fastened substantially in alignment with the retainer and having binding pins 44, 46 and 48 for connection thereon of said wires.

The core sections 18 and 20 are shown as consisting of a generally I-shaped section 18 and a generally C-shaped section 20. The coil leg 23 of core section 20 has a face 24 abutting against the side 22 of core section 18. The pole piece leg 27 of core section 20 has a face 28 maintained a small distance away from the pole piece side face 28 of core section 18 by means of the magnetic gap defining sliver 30.

In this embodiment also, the components are placed together and impregnated with a potting material subsequently cured for cementing the diverse elements securely in position. The active end of the transducer may also be spherically lapped, or the core may be disposed in such a way as to have the gap forming pole pieces project slightly from the retainer, in which case the pole pieces only are lapped in order to obtain a smooth and well defined magnetic flux deflecting gap.

The relative dimensions of the constitutive elements are such that the core assembly 18–20 may be rotated 180° in relation to the retainer slot in order to bring the gap along the centerline of the transducer for application where so required. Such an embodiment is not illustrated herein as it would result in mere duplication of the drawings.

The modification of FIGS. 7–9 is primarily designed to be combined with some auxiliary transducer holding means such as "flying" or fluid supported shoe, pad or bearing bar. For those applications it is desirable to obtain an electromagnetic transducer as small, compact, light and simple as feasible. The flux deflecting gap is usually visually aligned during assembly into the auxiliary holding means before fastening or bonding therein.

It is obvious that the C-shaped and I-shaped core sections of the embodiment of FIGS. 7–9 may be substituted for the inequal C-shaped core sections in the embodiments of FIGS. 1–6, and that the inequal C-shaped core sections of the embodiments of FIGS. 1–6 may be substituted for the combination of C-shaped and I-shaped core sections of FIGS. 7–9, such substitution being within the spirit and scope of the invention as claimed in the appended claims. Other substitutions, omissions and variations will be apparent to those skilled in the art and are comprised within the scope and spirit of the invention.

What is claimed as new is:

1. An electromagnetic transducer for recording intelligence on a magnetizable medium and for reading intelligence therefrom, said transducer comprising:

a substantially flat magnetic core forming a closed magnetic loop and comprising two unsymmetrical sections of unequal lengths disposed substantially in one plane, each one of said sections having first end surfaces abutting each other and second end surfaces separated by a thin sliver of non-magnetic material to provide a magnetic flux deflecting gap eccentric relatively to the center line of said magnetic core;

a signal coil surrounding part of said magnetic core proximate the two abutting end surfaces, said coil being provided with terminal wires;

a substantially cylindrical retainer of non-magnetic material provided with a longitudinal slot on one end thereof proximate the magnetic flux reflecting gap of the magnetic core and extending radially beyond the axis of said retainer and with a pocket proximate the signal coil, said slot and said pocket being adapted to hold snugly the magnetic core and the signal coil respectively, with said core having its magnetic flux deflecting gap substantially flush with one end of said retainer;

said slot in said retainer and said magnetic core being relatively dimensioned and arranged so that the slot in said retainer is adapted to hold the magnetic core with its flux deflecting gap aligned substantially with the longitudinal axis of said retainer in a first mode of assembly, said slot in said retainer being adapted to hold the magnetic core with its flux deflecting gap substantially eccentric to said longitudinal axis in a second mode of assembly wherein said magnetic core is situated in a plane rotated 180° around the center line of said magnetic core relatively to the plane in which said magnetic core is disposed in said first mode of assembly;

a terminal block of insulating material fastened to the other end of the retainer in alignment therewith and comprising a slotted passageway for the coil terminal wires, said terminal block having binding pins on its free end for connection thereon of said wires;

and a potting material for maintaining the diverse elements securely in position.

2. The electromagnetic transducer of claim 1 wherein the magnetic core comprises two substantially C-shaped sections.

3. The electromagnetic transducer of claim 1 wherein the magnetic core comprises a substantially C-shaped section and a substantially I-shaped section.

4. The electromagnetic transducer of claim 1 further comprising a tubular cylindrical shield surrounding the retainer proximate the end containing the magnetic flux deflecting gap.

5. The electromagnetic transducer of claim 1 wherein the end surface surrounding the magnetic flux deflecting gap is convex and is spherically lapped around an imaginary center situate on a line passing through said gap.

6. The electromagnetic transducer of claim 1 further comprising a substantially tubular cylindrical body housing encasing said transducer.

7. The electromagnetic transducer of claim 6 further comprising an orienting V-groove on the exterior of said body housing for reference for correct alignment of the magnetic flux deflecting gap.

References Cited by the Examiner
UNITED STATES PATENTS

| | | | |
|---|---|---|---|
| 2,886,652 | 5/1959 | Davis | 179—100.2 |
| 2,910,544 | 10/1959 | McNutt | 179—100.2 |
| 3,026,379 | 3/1962 | Carpenter | 179—100.2 |
| 3,053,940 | 9/1962 | Scarbrough | 179—100.2 |
| 3,105,965 | 10/1963 | Joannou | 179—100.2 X |

IRVING L. SRAGOW, *Primary Examiner.*

BERNARD KONICK, *Examiner.*